US010572419B1

(12) United States Patent
Lockard et al.

(10) Patent No.: US 10,572,419 B1
(45) Date of Patent: Feb. 25, 2020

(54) ORDERING FILTER DRIVERS IN A DEVICE STACK WITH FILTER LEVELS

(71) Applicant: Microsoft Technology Licensing, LLC, Redmond, WA (US)

(72) Inventors: Zachary A. Lockard, Woodinville, WA (US); Adam Lenart, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/154,688

(22) Filed: Oct. 8, 2018

(51) Int. Cl.
*G06F 13/36* (2006.01)
*G06F 13/362* (2006.01)

(52) U.S. Cl.
CPC .................. *G06F 13/362* (2013.01)

(58) Field of Classification Search
None
See application file for complete search history.

(56) References Cited

U.S. PATENT DOCUMENTS

| 6,993,603 | B2 | 1/2006 | Pudipeddi et al. |
| 7,024,403 | B2 | 4/2006 | Kyler |
| 7,150,018 | B2 | 12/2006 | Golds et al. |
| 8,495,030 | B2 | 7/2013 | Loo |

OTHER PUBLICATIONS

"Character device drivers", Retrieved from: https://linux-kernel-labs.github.io/master/labs/device_drivers.html, Retrieved on: Aug. 20, 2018, 30 Pages.
"File Driver Load Order", Retrieved from: https://www.bustrace.com/products/devfilter.htm, Retrieved on: Aug. 20, 2018, 3 Pages.
Hudek, Ted, "Installing a Filter Driver", Retrieved from: https://docs.microsoft.com/en-us/windows-hardware/drivers/install/installing-a-filter-driver, Apr. 20, 2017, 2 Pages.
Hudek, Ted, "Specifying Driver Load Order", Retrieved from: https://docs.microsoft.com/en-us/windows-hardware/drivers/install/specifying-driver-load-order, Apr. 20, 2017, 4 Pages.

*Primary Examiner* — Scott C Sun

(57) ABSTRACT

The disclosure herein describes generating an ordered filter driver list defining a processing order of filter drivers in a device stack for a device. A filter driver level order associated with the device is defined, and a request from an entity is received for an ordered filter driver list. Filter driver data of filter drivers associated with the device is accessed from a data store. The filter driver data includes an identifier and filter driver level of each filter driver. The ordered filter driver list is generated to include the filter driver identifiers of the plurality of filter drivers in an order of the associated filter driver levels in the filter driver level order. The ordered filter driver list is provided to the entity. The use of filter driver levels and an associated order enables accurate, declarative order assignment of filter drivers.

20 Claims, 5 Drawing Sheets

ORDERING FILTER DRIVERS IN A DEVICE STACK WITH FILTER LEVELS

BACKGROUND

In computing systems, filter drivers are configured to intercept and manipulate input/output (I/O) messages and other communication between drivers, devices, operating systems, and possibly other programs or software entities. Each filter driver may be configured to intercept I/O messages and to cause a particular operation or operations to be performed therewith. The filters are positioned above or below other filters within a stack-like configuration. However, with existing systems, there is no declarative way for an application to specifically order the filter drivers. Rather, the driver stack for the associated device is evaluated at runtime by an operating system to determine the appropriate place for the filter driver to be inserted into the driver stack. The evaluation of the order of filter drivers within the driver stack often requires substantial knowledge or understanding of what other drivers, filter drivers, and/or other elements are present and may affect the I/O message before and/or after the filter driver to be inserted. Such existing installation schemes (e.g., via a separate executable installation program, etc.) consume processing and memory resources, affecting the performance of the device. Further, some existing mechanisms require explicit ordering and are dependent on knowledge of other surrounding filters, which leads to conflicts and awkward dependencies between different filter vendors.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A computerized method and system for generating an ordered filter driver list defining a processing order of filter drivers of a device is described. A filter driver level order associated with the device is defined and a request from an entity is received for an ordered filter driver list associated with the device. Filter driver data of a plurality of filter drivers associated with the device is accessed from a filter driver data store. The filter driver data includes a filter driver identifier of each filter driver of the plurality of filter drivers and a filter driver level of each filter driver of the plurality of filter drivers. The ordered filter driver list is generated based on the accessed filter driver data, wherein the ordered filter driver list includes the filter driver identifiers of the plurality of filter drivers in an order based on the associated filter driver levels and the defined filter driver level order. The ordered filter driver list is then provided to the entity, wherein the entity is configured to process I/O messages associated with the device through the plurality of filter drivers in the order of the ordered filter driver list.

Many of the attendant features will be more readily appreciated as the same becomes better understood by reference to the following detailed description considered in connection with the accompanying drawings.

BRIEF DESCRIPTION OF THE DRAWINGS

The present description will be better understood from the following detailed description read in light of the accompanying drawings, wherein:

Corresponding reference characters indicate corresponding parts throughout the drawings. In FIGS. 1 to 5, the systems are illustrated as schematic drawings. The drawings may not be to scale.

DETAILED DESCRIPTION

Figure 1:
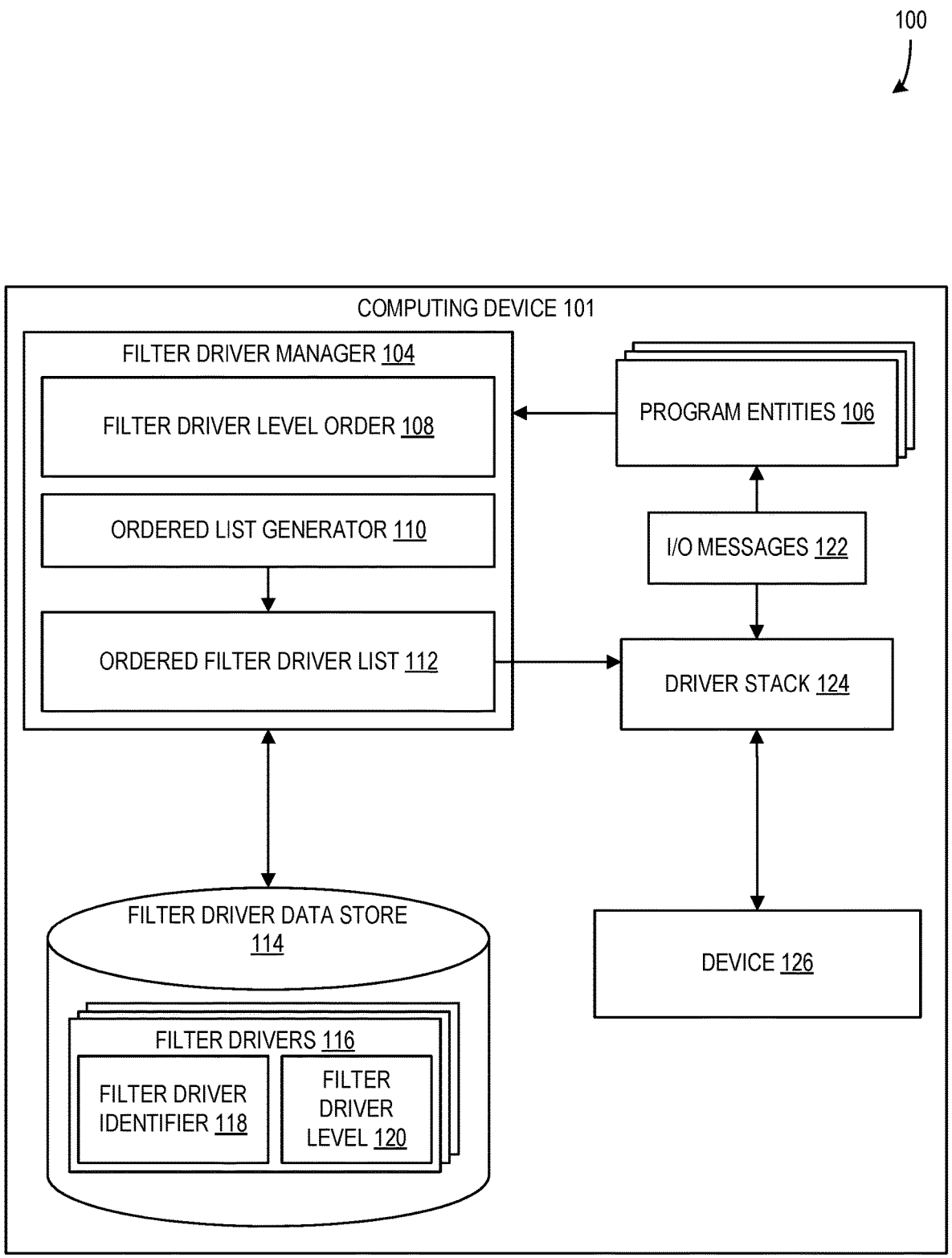
FIG. 1 is an exemplary block diagram illustrating a system configured for providing an ordered filter driver list for use in interacting with an associated device according to an embodiment.

Aspects of the disclosure provide a computerized method and system for generating an ordered filter driver list defining a processing order of filter drivers for a device. A filter driver level order associated with the device is defined. Requests from entities (e.g., the operating system, processes, applications, etc.) are received for an ordered filter driver list associated with the device. Filter driver data of filter drivers associated with the device is accessed from a filter driver data store. The filter driver data includes a filter driver identifier and a filter driver level of each of the filter drivers. The ordered filter driver list is generated based on the accessed filter driver data, wherein the order filter driver list includes the filter driver identifiers of the filter drivers in an order based on the associated filter driver levels and the defined filter driver level order. The ordered filter driver list is then provided to the requesting entity, wherein the entity is configured to process I/O messages and/or other communications associated with the device through the plurality of filter drivers as directed by the order of the ordered filter driver list.

The described methods and systems provide a declarative way of registering class-based filter drivers to a system (e.g., an operating system, etc.) for use with devices (e.g., peripheral devices or components) associated with a computing device and of dynamically providing ordered access of those class-based filter drivers during operation of the system. The devices receive or transmit I/O data to other components of the computing device (or to other computing devices, such as in the case of a network interface). When a device is added to the computing device along with new filter drivers, any previously-installed filter drivers associated with class-based levels are merged with any previously-installed filter drivers (e.g., legacy software-based filter drivers, etc.) listed in registry values, along with the new filter drivers, providing backwards compatibility through maintaining the functionality of the legacy software-based filter drivers. As a result, legacy software that is not configured to make use of the level order system described herein may still have its filter drivers installed and functions unimpeded, while software that is configured to make use of the levels described herein may add filter drivers based on classes in a deterministic way as described herein.

The disclosure functions in an unconventional way by allowing for the declarative inclusion of filter drivers based on the class, function, and/or purpose of the filter driver (e.g., encryption-based filter drivers, etc.) without requiring the installation program to have significant knowledge or analysis of other filter drivers that may be present in the stack, all while enabling registry filter drivers to continue to function (and be installed). For example, upon installation, an encryption-based filter driver may be added to the encryption level and, in future I/O processing, the functionality of the added filter driver occurs at the order location associated with the encryption level of the device stack.

A published manifest of the levels and the order thereof further enables rapid identification of possible classes and accurate determination of the appropriate class for associated filter drivers. Users who design or otherwise manage filter drivers of devices and/or software interactions therewith are able to seamlessly assign new filter drivers to appropriate levels based on the classes of the levels or other associated context information without exhaustively researching current states of device stacks and all the filter drivers therein. For example, different filter drivers within the same driver stack may be supplied by different vendors, where each vendor installs their respective filter drivers independent of one another. The registration mechanism as described herein allows the vendors to express the intended usage and/or interoperability layer in an abstract way that indirectly controls ordering. This helps to alleviate difficulties encountered with a less abstract registration mechanism where the ordering is more explicit and dependent on knowledge of other surrounding filters, which can lead to more conflicts and awkward dependencies between different vendors.

Aspects of the disclosure, through the ordered filter driver list, use less processing and memory resources while allowing declarative installation of filter drivers for a device stack. While described with reference to processing messages to/from devices, aspects of the disclosure are operable to process any form of communication, structured or otherwise.

FIG. 1 is an exemplary block diagram illustrating a system 100 configured for providing an ordered filter driver list 112 for use in interacting with an associated device 126 according to an embodiment. The system 100 includes an operating system, a filter driver data store 114, and the device 126, which may all be components of or otherwise associated with a computing device 101. Alternatively, the operating system and/or components thereof, the filter driver data store 114, and/or the device 126 may be associated with multiple computing devices and may be configured to interact via network connections, etc. such as in a cloud environment.

In some examples, the operating system includes a filter driver manager 104 and program entities 106 (e.g., applications or other processes). The program entities 106 are configured to communicate with the device 126 using input/output (I/O) messages 122 passed through the driver stack 124. The filter driver manager 104 is a component or set of components (e.g., of the operating system, kernel, and/or other configuration programs, etc.) configured to provide an ordered filter driver list 112 for use in configuring the driver stack 124 based on the filter driver data of filter drivers 116 stored on the filter driver data store 114. The ordered filter driver list 112 is used for processing I/O messages or other data. It should be understood that, while the filter driver manager 104 and program entities 106 may be part of the operating system in some examples, they may be separate from and/or in communication with the operating system in other arrangements that would be understood by a person of ordinary skill in the art.

The filter driver manager 104 includes, or has access to, a filter driver level order 108, an ordered list generator 110, and an ordered filter driver list 112 when generated by the ordered list generator 110. The filter driver manager 104 may include hardware, firmware, and/or software configured to perform the operations described herein. The filter driver level order 108 is a data structure that includes a list, set, or other identification or arrangement of filter driver levels that may be used in a driver stack 124. A filter driver level is associated with a class, type, or category of filter driver. In operation, a filter driver level includes filter drivers that share similar operations and/or purpose (e.g., antivirus filter drivers, backup filter drivers, encryption filter drivers, etc.), or that may otherwise be suitable for processing I/O messages at substantially the same time relative to other filter drivers not at the same level (e.g., default upper level filter drivers, etc.). Aspects of the disclosure are not limited to the various filter types described herein, but to any filter type known or contemplated by one of ordinary skill in the art.

The filter driver level order 108 may be configured to define an order of filter driver levels relative to other filter driver levels, and/or relative to a main or core device driver. The order defines when the filter drivers and core device driver are applied during I/O message processing to the device 126. The filter driver level order 108 may be defined by a system administrator or other user. A default filter driver level order 108 may be configured during installation and/or setup of the associated device 126, and/or the filter driver level order 108 may be maintained and/or adjusted by a user, the operating system, other program entities 106, or other applications or entities.

In some examples, the filter driver manager 104 is configured to publish the filter driver level order 108 as a manifest or other data structure to enable program entities 106 and/or other applications to access the filter driver level order 108. The manifest may include information identifying the filter driver levels and the order in which the levels are processed during I/O message processing. Program entities 106 may be configured to access the published filter driver level order 108 to determine how and where to add, remove, or otherwise change their filter drivers. For example, a newly installed program entity 106 may specify a filter driver level in which to insert a filter driver based on the published filter driver level order 108 manifest.

In some examples, the ordered list generator 110 is a component of the filter driver manager 104, and is configured to obtain filter driver data of the filter drivers 116 in the filter driver data store 114 and to generate an ordered filter driver list 112 based on the filter driver level order 108. The filter drivers 116 each include a filter driver identifier 118 and a filter driver level 120 (e.g., an indicator of a level of the filter driver level order 108 with which the filter driver 116 is associated). In some examples, filter driver data of filter drivers 116, including the filter driver identifier 118 and filter driver level 120 may be stored in an associated configuration file or setup file (e.g., an INF file associated with the filter driver 116, etc.). Filter drivers 116 that include filter driver levels 120 may also be called "declarative filters" or "declarative filter drivers". Declarative filter drivers may be added for devices based on an operating system or other associated programming entity and/or they may be provided by a third party in combination with an associated device. In some examples, the ordered list generator 110 is configured to append the filter driver identifiers 118 of the declarative filter drivers to the ordered filter driver list 112 (e.g., as a declarative filter driver list or declarative filter list, etc.) based on the order of the associated filter driver levels 120 in the filter driver level order 108. The ordered filter driver list 112 may then be provided to the operating system and/or program entities 106. The process of generating the ordered filter driver list 112 is described in greater detail below with respect to FIGS. 3 and 4.

In some examples, the filter drivers 116 include filter drivers that lack a filter driver level 120, such as registry filter drivers (e.g., filter drivers that are stored in a registry driver list, such as legacy filter drivers or filter drivers otherwise not configured for use with the filter driver levels, etc.). Filter driver data of such filter drivers may be stored in the filter driver data store 114 and/or in one or more other data stores, system registries, etc. The filter driver level order 108 may include one or more default filter driver levels within the order 108 that are used with filter drivers 116 that do not have a defined filter driver level 120. Further, if a filter driver 116 does not include a specific filter driver level 120 but does include alternative filter driver order information (e.g., explicitly defined filter driver position within a registry filter list, etc.), the ordered list generator 110 may be configured to account for the alternative filter driver order information (e.g., merging registry filter drivers with declarative filter drivers based on identifying filter driver overlap "inflection points" to form a compound filter list as the ordered filter list 112 as described below with respect to FIG. 4, etc.) Alternative filter driver information includes legacy order data associated with filter drivers of a registry filter list, indicators of order relative to other related filter drivers, indicators that the filter driver is an upper level filter driver (e.g., for processing before the main device driver on I/O messages bound for the device 126) or a lower level filter driver (e.g., for processing after the main device driver on I/O messages bound for the device 126), and the like.

Inflection point filter drivers may result from efforts to support registry filter drivers after implementation of the class-based level ordering described herein. To support legacy scenarios, the initial filter drivers, which are already present in the registry list or a similar data structure of the system, should be added to levels of the new filter driver level order as described herein. The initial legacy-based filter driver list will then match the initial ordered filter driver list generated by the new system. Previously established order of the registry-based filter drivers is maintained, and new filter drivers may be merged as described herein. In some cases, each legacy-based or registry-based filter driver may be assigned a separate level in order to maintain the exact order of the legacy implementation. Other class-based levels may then be defined for use with newly added declarative filter drivers.

In some examples, a filter driver level in the filter driver level order may include one or more sub-levels therein that further define the order of filter drivers within that level. For instance, an encryption level may include a "pre-encryption" sub-level that includes filter drivers configured to be processed prior to filter drivers that are associated with the general encryption level and/or a "post-encryption" sub-level that includes filter drivers configured to be processed after filter drivers that are associate with the general encryption level. Alternatively, or additionally, the filter driver level 120 of a filter driver 116 may indicate a sub-level for placement of the filter driver 116 and/or an order location relative to a particular driver level. For instance, a filter driver level 120, instead of identifying a particular filter driver level, may indicate that the filter driver 116 should be processed before a particular level, after a particular level, between two levels, or the like.

The program entities 106 may include applications, processes associated with the operating system, and/or interfaces associated with other software and/or applications, or the like. While the program entities 106 may be components within the operating system, it should be understood that, in other examples, they may be separate from the operating system and/or components of software applications, software layers, etc. of an associated computing system without departing from the description. The program entities 106 are configured to send and receive I/O messages 122 to and from the device 126 and/or other devices of an associated computing system.

The I/O messages 122 may include messages for instructing the device 126 to perform operations, to request information from the device 126, to receive information from the device 126, etc. Interactions between the program entities 106 and the device 126 via I/O messages 122 may be performed in any manner that would be understood by a person of ordinary skill in the art without departing from the description.

The driver stack 124 includes, in some examples, a main device driver configured to enable communication between program entities 106 and the device 126. Further, the driver stack may include one or more filter drivers 116 arranged in an order defined by the ordered filter driver list 112. Each I/O message 122 is processed by the included filter drivers 116 and the main device driver in the defined order prior to reaching its destination (e.g., the device 126, a program entity 106, etc.). Each filter driver 116 may interrupt the flow of an I/O message 122 to perform operations on the data therein, log information associated with the I/O message 122, perform status checks on the data therein, etc. For example, filter drivers 116 may perform operations on an I/O message 122 to encrypt the data being transported, check the data for errors or potential malware, and/or record the passage of the I/O message 122 in an associated log file. Other types of filter drivers, as would be understood by a person of ordinary skill in the art, may be included in the driver stack 124 without departing from the description.

In some examples, the device 126 is a hardware component of a computing system with which the operating system is associated. The operating system and associated components may be configured to interact with a plurality of devices such as device 126 without departing from the description. The device 126 may be computer memory, a hard drive, a disk drive, or some other peripheral hardware device as would be understood by a person of ordinary skill in the art (e.g., a monitor, keyboard, mouse, speakers, network interface, user interface, etc.). In some examples, the device 126 may be of a defined device class and the filter drivers 116 may be associated with the device class, such that the filter drivers 116 may be applied to multiple devices so long as the devices are also of the defined device class (e.g., a class of hard disk drives, a class of monitors, etc.). In other examples, the device 126 is a virtual device. Further, it should be understood that the filter drivers described herein may be applied to any functionality of the device 126 as would be understood by a person of ordinary skill in the art. For instance, filter drivers for a keyboard device may include filter drivers that handle or otherwise monitor key press input from the keyboard generally and additional filter drivers may be installed that perform special operations associated with specific keys of the keyboard (e.g., function keys, other special keys, etc.).

Figure 2:
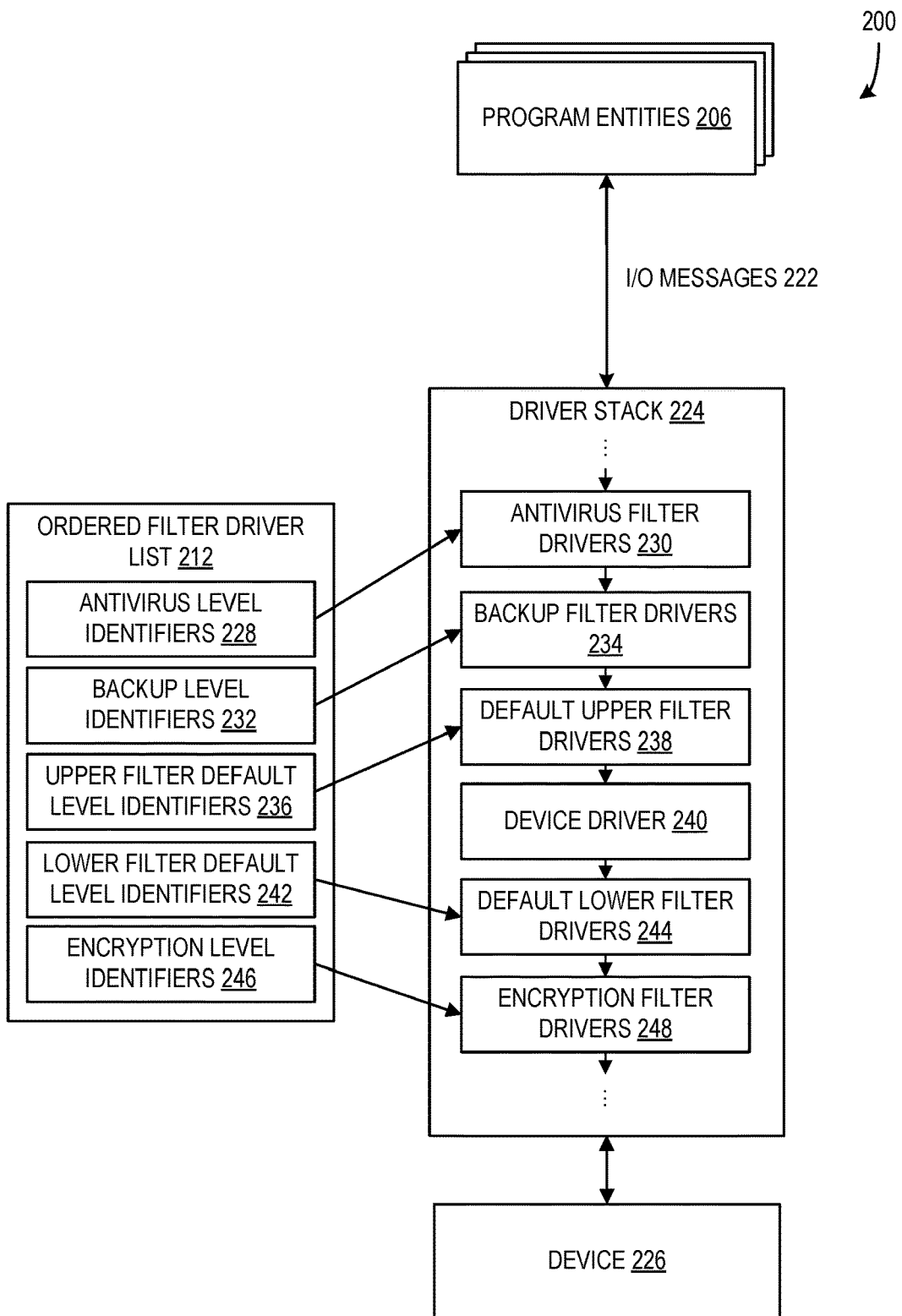
FIG. 2 is an exemplary block diagram illustrating a configuration of a driver stack of a device based on an ordered filter driver list according to an embodiment.

FIG. 2 is an exemplary block diagram 200 illustrating a configuration of a driver stack 224 of a device 226 based on an ordered filter driver list 212 according to an embodiment.

It should be understood that the program entities 206 are configured to communicate with the device 226 using I/O messages 222 or other data passed through the driver stack 224 in a similar manner as described with respect to FIG. 1.

The ordered filter driver list 212, in this example, includes antivirus level identifiers 228 of associated antivirus filter drivers 230 that are translated into the antivirus filter drivers 230 being included in the driver stack 224 at the illustrated location relative to the other drivers. Backup level identifiers 232 associated with backup filter drivers 234, upper filter default level identifiers 236 associated with default upper filter drivers 238, lower filter default level identifiers 242 associated with default lower filter drivers 244, and encryption level identifiers 246 associated with encryption filter drivers 248 are also included in the ordered filter driver list 212, resulting in the ordering of the associated filter drivers in the driver stack 224 as illustrated. The driver stack 224 further includes the main device driver 240 associated with the device 226. While the ordered filter driver list 212 does not include an entry for the device driver 240 in this example, in other examples the ordered filter driver list may be generated to include an indicator for the main device driver to ensure that the filter drivers are placed in the desired locations relative to the main device driver.

It should be understood that, while the ordered filter driver list 212 includes the illustrated levels 228, 232, 236, 242, and 246, in other examples, more, fewer, or different levels may be included in an ordered filter driver list 212 without departing from the description herein. For instance, in some examples, the ordered filter driver list 212 is a compound filter list that includes both declarative filter driver identifiers and registry filter driver identifiers ordered according to the merging process described below with respect to FIG. 4.

In some examples, the upper filter default and lower filter default levels may not be absolute levels, but instead, any level that is "above" the device driver 240 may be defined as the upper filter default level and any level that is "below" the device driver 240 may be defined as the lower filter default level. For instance, the backup level may be defined as the upper filter default level and the encryption level may be defined as the lower filter default level. Alternatively, there may only be a single default level that is located either above or below the device driver 240. Any default levels may be defined in an associated filter driver level order (e.g., filter driver level order 108, etc.) as described herein.

The driver stack 224, as illustrated, is configured to cause I/O messages 222 bound for the device 226 from the program entities 206 to be processed by antivirus filter drivers 230, then by backup filter drivers 234, then by default upper filter drivers 238, then by device driver 240, then by default lower filter drivers 244, and finally by encryption filter drivers 248. I/O messages 222 that are bound for the program entities 206 from the device 226 may be processed by the filter drivers and device driver 240 in the opposite order. It should be understood that some filter driver and/or device driver operations may be applied to device-bound I/O messages 222 and not to program entity-bound I/O messages 222, and/or some filter driver and/or device driver operations may be applied to program entity-bound I/O messages 222 and not to device bound I/O messages 222. Alternatively, or additionally, filter driver and/or device driver operations may be applied to all I/O messages 222, regardless of direction. In some examples, the driver stack 224 may include more, fewer, or different filter drivers arranged in different orders without departing from the description.

Figure 3:
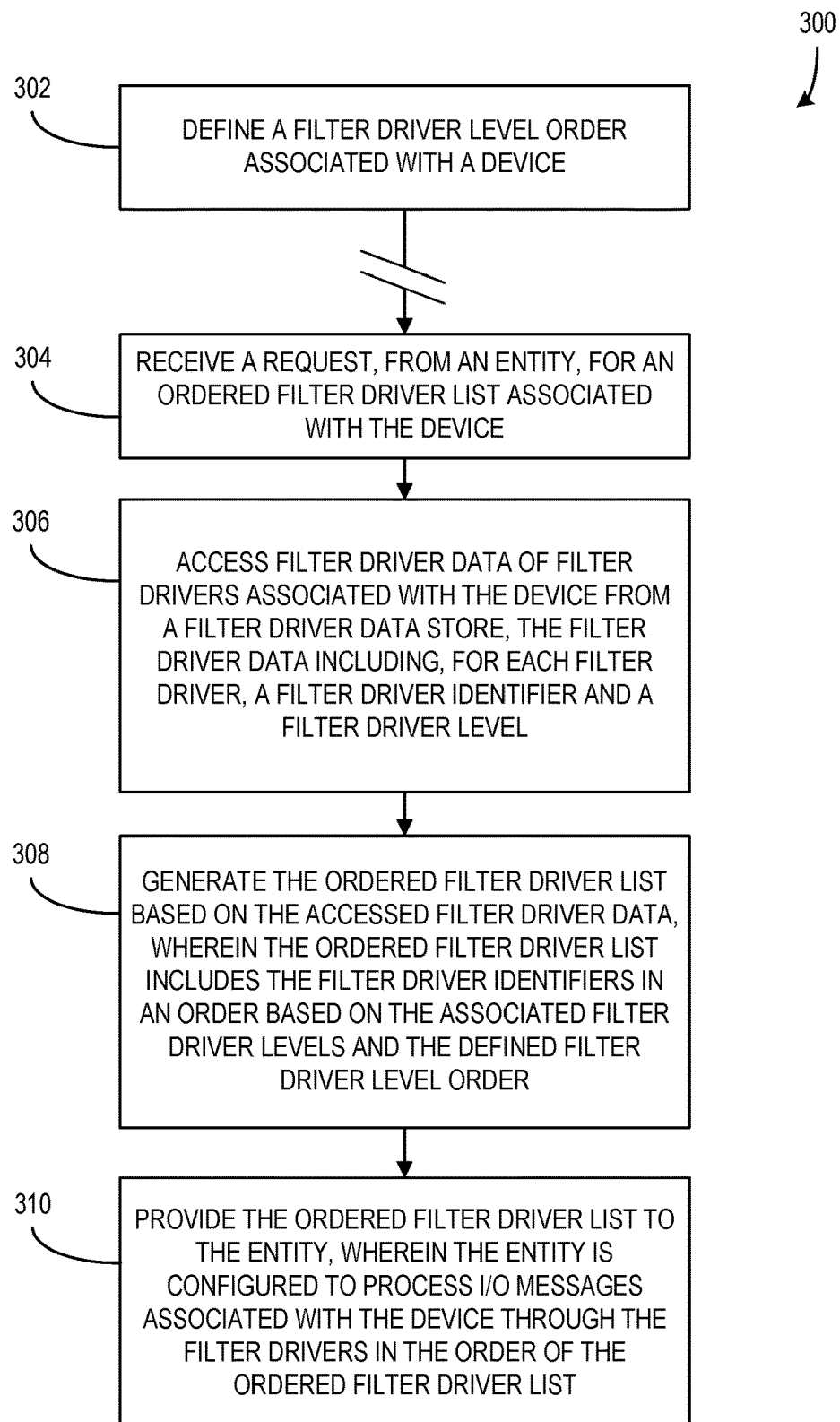
FIG. 3 is an exemplary flow chart illustrating a method of providing an ordered filter driver list for use in interacting with an associated device according to an embodiment.

FIG. 3 is an exemplary flow chart 300 illustrating a method of providing an ordered filter driver list (e.g., ordered filter driver list 112, etc.) for use in interacting with an associated device (e.g., device 126, etc.) according to an embodiment. It should be understood that the operations of this method may be performed by a system configured as described herein (e.g., system 100, etc.). At 302, a filter driver level order (e.g., filter driver level order 108, etc.) associated with a device is defined. The definition of the filter driver level order may be performed by a user and/or software of a system as described above. Defining the filter driver level order may include publishing the order or otherwise making the order available to other entities of the system (e.g., receiving a request for the order and responding to the request by providing the order, etc.). The defined order may include filter driver levels, including data identifying and/or describing the filter driver levels (e.g., unique level names, level codes, and/or other level identifiers, descriptive terms or other context data that may be used by other entities to determine levels for filter drivers, etc.).

In some examples, other entities may receive or otherwise access the defined filter driver level order associated with the device as described herein. For instance, an entity may send a request for the order prior to attempting to establish communication with the device or otherwise initializing the device for communication by loading its associated function and filter drivers and binding them together to form the device driver stack. Such a request may trigger the merging of the filter drivers into the ordered list as described, such that the merging and generation of the ordered list is performed dynamically at the time of the request. Alternatively, or additionally, an entity may access a published manifest of the filter driver level order prior to attempting to install a new filter driver for use with the associated device, to determine where to place the new filter driver in the device stack. Installation of a new filter driver does not require performance of a separate executable installation program, but rather the new filter driver data, including an associated filter driver level identifier is added to the set of stored filter drivers (e.g., in filter driver data store 114, etc.). Because the ordered list is generated dynamically upon request, no further processing of the newly installed filter driver may be necessary. In some examples, the filter driver level order may be defined and made accessible for a substantial period of time prior to 304. Further, the defined filter driver level order may be used as described herein for a plurality of requests throughout such a time period. For example, the disclosure contemplates a caching mechanism whereby the ordered filter driver list produced by a request is cached for a given device and/or class to optimize servicing of future requests by delivering the ordered filter drive list from a cache. The cached list is invalidated upon any relevant changes to the filter driver data store so as to cause the next request for the ordered filter driver list to contextually rebuild the ordered list with the most recent driver filter data.

Later, at 304, a request is received, from an entity, for an ordered filter driver list associated with the device. In some examples, the received request includes an identifier of the device and/or an identifier of the associated filter driver level order. The entity from which the request is received may be the operating system or another application or software entity of an associated system as described above.

At 306, filter driver data of a plurality of filter drivers (e.g., filter drivers 116, etc.) associated with the device is accessed from a filter driver data store (e.g., filter driver data store 114, etc.). The filter driver data includes a filter driver identifier (e.g., filter driver identifier 118, etc.) of each filter driver of the plurality filter drivers and a filter driver level (e.g., filter driver level 120, etc.) of each filter driver of the plurality of filter drivers.

In some examples, as described above, accessing the filter driver data may further include accessing filter drivers that fail to specify filter driver levels, and/or that may include other filter driver order data (e.g., registry filter drivers, etc.). In such examples, any additional data associated with the filter drivers may be accessed for use during generation of the ordered filter driver list.

At 308, the ordered filter driver list (e.g., ordered filter driver list 112, etc.) is generated based on the accessed filter driver data, wherein the ordered filter driver list includes the filter driver identifiers of the plurality of filter drivers in an order based on the associated filter driver level order. In an example, the filter driver data includes filter drivers A, B, C, and D. Filter drivers A and C are associated with a backup filter level and filter drivers B and D are associated with an encryption filter level. The filter driver level order indicates that the backup filter level is before the encryption filter level. The ordered filter driver list is generated by merging the filter drivers in an order based on the filter driver level order, so, in this example, the ordered filter driver list includes filter driver identifiers of the filter drivers in the following order: Driver A, Driver C, Driver B, Driver D (e.g., the backup filter level drivers are first, followed by the encryption level drivers). In some examples, the order of the filter drivers within a particular level does not matter (e.g., in the above example, the backup filter level may include A before C or C before A). The ordered filter driver list generation process, including the merging of registry filter drivers and declarative filter drivers into a compound filter driver list, is described in further detail below with respect to FIG. 4.

At 310, the ordered filter driver list is provided to the requesting entity, wherein the entity is configured to process messages associated with the device through the plurality of filter drivers in the order of the ordered filter driver list. For example, if the requesting entity is an operating system, the operating system knows, based on the ordered filter driver list, how to process I/O messages to/from the device. Providing the ordered filter driver list may include transmitting or otherwise sending the list data to the entity via communication buses or other methods of communication within the system or computing device 101. Alternatively, or additionally, the ordered filter driver list may be published on the system such that the requesting entity and/or other entities may access it for use in interacting with the device.

In some examples, entities (e.g., program entities 106, etc.) may access the system (e.g., a filter driver manager 104, etc.) to install or otherwise add a filter driver 116 to be associated with a device. A program entity may access a published filter driver level order, determine a level with which the new filter driver will be associated, and provide the filter driver, including the filter driver identifier and the determined level, to the system. The system may be configured to update a filter driver data store (e.g., filter driver data store 114, etc.) with the filter driver data of the new filter driver, such that subsequent ordered filter driver lists associated with the device include the new filter driver as part of the determined filter driver level. Alternatively, other methods may be used to add, remove, or update filter drivers in the data store and/or system as would be understood by a person of ordinary skill in the art without departing from the description.

Figure 4:
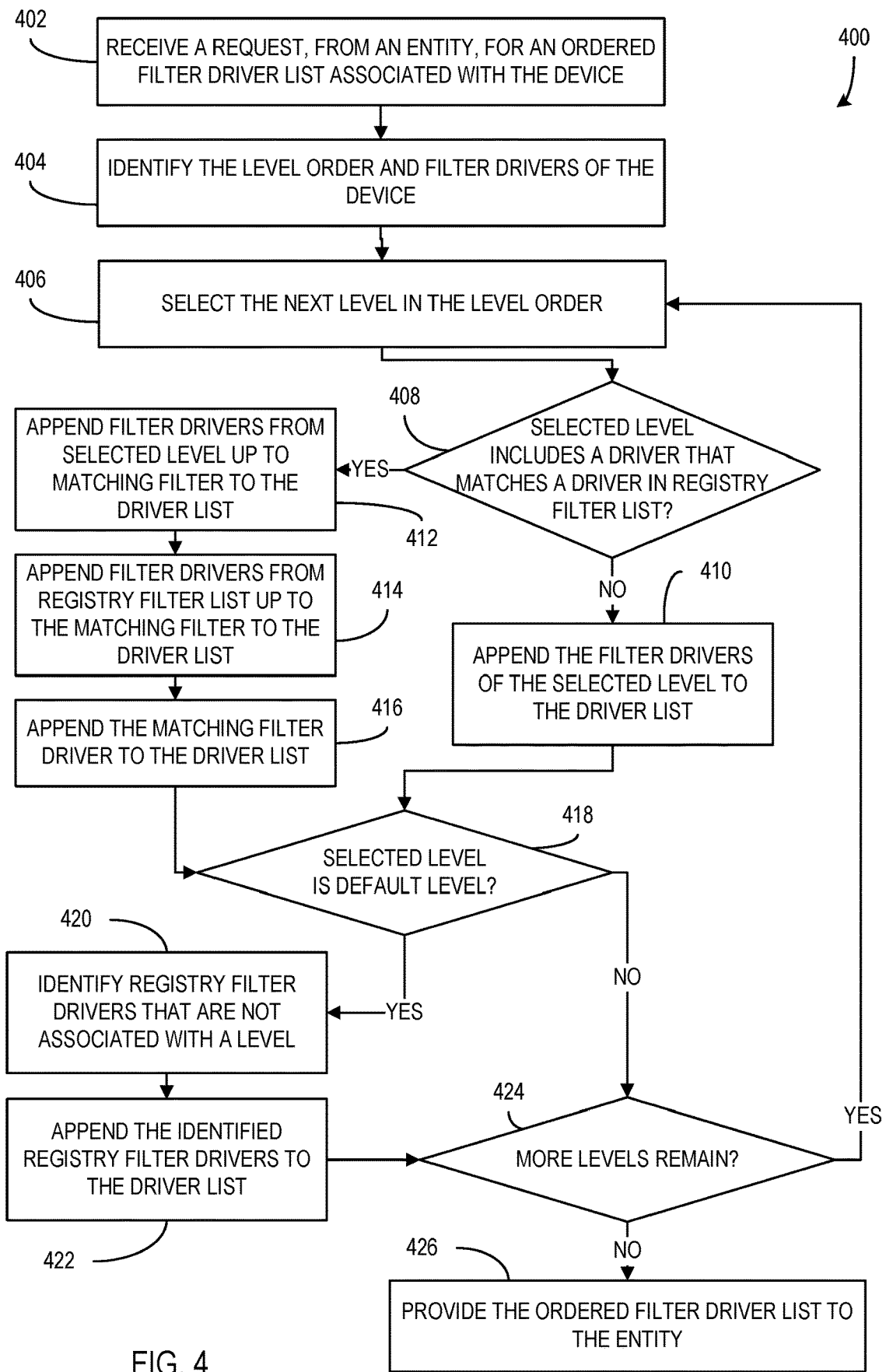
FIG. 4 is an exemplary flow chart illustrating a method of merging filter drivers into an ordered filter driver list according to an embodiment.

FIG. 4 is an exemplary flow chart 400 illustrating a method of merging filter drivers (e.g., filter drivers 116, etc.) into an ordered filter driver list (e.g., ordered filter driver list 112, etc.) according to an embodiment. At 402, a request is received from an entity for an ordered filter driver list associated with the device, as described above with respect to 302 of FIG. 3. At 404, the level order and filter drivers of the device are identified. The level order may be identified based on a published manifest (e.g., published by a filter driver manager 104, etc.). The filter drivers may also be accessed from a filter driver manager 104 or similar component as described herein.

At 406, the next level in the level order is selected. The levels are selected in the order of the identified level order, such that the next level indicates the next set of associated filter drivers that will be processed in an associated driver stack as described herein. On the first performance of 406, the first level in the level order is selected, with subsequent levels being selected in order throughout the process described by flow chart 400.

At 408, if the selected level includes a driver that matches a driver in a registry filter list (or another type of filter driver list, such as other legacy filter drivers, etc.), the process continues at 412. Alternatively, if the selected level does not include a driver that matches another list, the process continues at 410. Drivers that are identified as matching lists or groups of drivers other than the selected level are "inflection point" drivers that are used during the merge process to ensure that the associated groups of drivers are added to the driver list in an appropriate order, as described below.

At 410, the filter drivers (e.g., filter driver identifiers of the filter drivers and/or other associated information, etc.) of the selected level are appended to the driver list. In some examples, the filter drivers may be appended to the driver list in any feasible order within the level. In some example, it may be assumed that processing order of the filter drivers within a level is not considered when merging the filter drivers. Alternatively, a defined order and/or default order may be used within the level (e.g., an alphabetical order or similar order based on filter driver identifiers, an order based on when the filter drivers were added to the filter order data store, etc.).

Alternatively, if there is an identified "inflection point" driver in the selected level at 408, the filter drivers from the selected level up to but excluding the matching filter are appended to the driver list at 412. Then, at 414, filter drivers from the registry filter list (or another list associated with the matching filter) are appended to the driver list. Finally, the matching filter driver is appended to the driver list at the end of both the filter drivers of the selected level and the filter drivers of the other associated driver list. In this way, lists or groups of filters that are configured outside of the describe filter level order system (e.g., groups of legacy drivers, etc.) may be integrated into the ordering system in an order location based on matching or overlapping drivers.

If, at 418, the selected level is a default level, the process proceeds to 420. Alternatively, if the selected level is not a default level, the process proceeds to 424. In some examples, the level order for the device may have a single level that is designated as a default level. Alternatively, more than one default level may be defined, and determining which default level with which a filter driver may be associated may be based on other filter driver data (e.g., whether the filter driver is an upper filter driver or a lower filter driver when there is a default upper filter level and a default lower filter level as shown in FIG. 2, etc.).

At 420, any registry filter drivers or other filter drivers not associated with a level of the level order are identified and, at 422, the identified filter drivers are appended to the driver list. As a result, even though the identified filter drivers are not configured for use with the level order system described, they are integrated in the ordered filter driver list in a defined default position. After 422, the process proceeds to 424.

At 424, if more levels of the level order remain to be selected, the process returns to 406 to select the next level in the level order. Alternatively, if no levels remain to be selected, the process proceeds to 426, and the ordered filter driver list that has been generated based on the described merging process is provided to the requesting entity as described previously herein.

Additional Example Scenarios

Aspects of the disclosure enable various additional scenarios, such as next described.

In an example, the operating system of a computing system requests an ordered filter driver list associated with a hard drive device of the computing system from a filter driver manager component (e.g., the kernel, configuration manager, or other portion of an operating system). The filter driver manager receives the request and proceeds to generate the ordered filter driver list. The filter driver manager accesses a filter driver data store that stores filter driver data associated with the hard drive device. The filter driver data includes data associated with a plurality of declarative filter drivers as well as registry filter drivers. The declarative filter driver data includes filter driver levels for each filter driver that are associated with a filter driver level order of the hard drive device. The filter driver manager compares the filter driver data of the declarative filter drivers and the registry filter drivers and identifies an inflection point driver that is associated with a set of registry filter list and a particular filter driver level. Other registry filter drivers are identified that are not associated with an inflection point driver.

The filter driver manager begins with the first filter driver level in the filter driver level order and appends filter driver identifiers of declarative filter drivers that associated with the first filter driver level to the ordered filter driver list. After the first level of filter drivers have been added to the ordered filter driver list, the filter driver manager proceeds to append filter driver identifiers of subsequent levels of filter drivers in the order defined by the filter driver level order.

During the filter driver list generation, the filter driver manager reaches the filter driver level associated with the identified inflection point driver. The filter driver manager then appends the filter drivers associated with the filter driver level to the ordered filter driver list except for the inflection point driver, followed by the set of associated registry filter drivers. Finally, the inflection point driver is appended to the ordered filter list as the last entry for the associated filter driver level and the declarative filter drivers and registry filter drivers are merged together for the filter driver level.

Later, during the filter driver list generation, the filter driver manager reaches a filter driver level that is flagged as the default filter driver level. The filter driver manager then identifies filter drivers, such as the registry filter drivers, that are otherwise not associated with a level of the filter driver level order. These identified filter drivers are then appended to the ordered filter driver list in association with the default filter driver level.

When the ordered filter driver list is generated, the filter driver manager provides the list to the operating system based on the request. The operating system uses the provided list to process I/O messages to and from the hard drive device, applying filter drivers to the messages in the order defined in the ordered filter driver list.

In another example, a new filter driver associated with encryption of data that is to be stored on the hard drive device is being installed by a third-party software entity. The filter driver manager publishes a manifest that includes the filter driver level order. The manifest is accessed and it is determined that there is an encryption-based level that is processed after the core device driver, before the I/O message reaches the hard drive for storage. The new filter driver is then provided to the filter driver manager, including a new filter driver identifier and a filter driver level indicator associated with the encryption-based level. The filter driver manager updates the filter driver data store to include the filter driver data of the new filter driver. Later, ordered filter driver lists for the hard drive device are generated to include the new filter driver in the encryption-based level with other encryption filter drivers.

In another example, exemplary implementation details are described. Two registry values are written to the registry by an installation manifest as part of a class filter level definition, as shown in pseudocode below.

UpperFilterLevels: "LevelA","LevelB","LevelC"
UpperFilterDefaultLevel: "LevelC"

The first row defines the order of the levels for the upper filter drivers. The second row defines the default level for the upper filter drivers. In this case, Level A is first in the order, then Level B, and finally Level C. For the purposes of handling registry filter drivers or other filter drivers that are not associated with a level, Level C will be treated as the default level as described herein. It should be understood that similar registry entries may be made for defining lower filter driver level order and a default level for the lower filter drivers as well.

In yet another example, pseudocode syntax for adding a filter driver is shown below.

[Filters]
AddFilter: <FilterName>, <FilterConfig>
[<FilterConfig>]
FilterLevel: <LevelName>

The first portion shows an "AddFilter" line that includes a <FilterName>, which is the filter driver identifier and a pointer to a "<FilterConfig>" section, which may contain data describing the associated filter driver. The "<FilterConfig>" is then shown, and it includes a line defining the "FilterLevel" as <LevelName>, which is the filter driver level as described herein. Alternatively, the "<FilterConfig>" section could also include a line defining a "FilterPosition" as being either "Upper" or "Lower", which may be used in a case where the particular class has a specific place for third-party filters to be inserted.

For instance, a system may be designed to include the following upper filter driver level configuration.

UpperFilterLevels: "inbox", "thirdparty"
UpperFilterDefaultLevel: "thirdparty"

The "thirdparty" filter level is the only level configured for use by third-party filter drivers. So, a third-party filter driver may include a line that defines a "FilterLevel" value of "thirdparty". However, the system may also enable the third-party filter driver to function in the same way by simply defining a "FilterPosition" of "Upper". The system will direct the third-party filter driver to be in the "thirdparty" level based on the above configuration.

Exemplary Operating Environment

Figure 5:
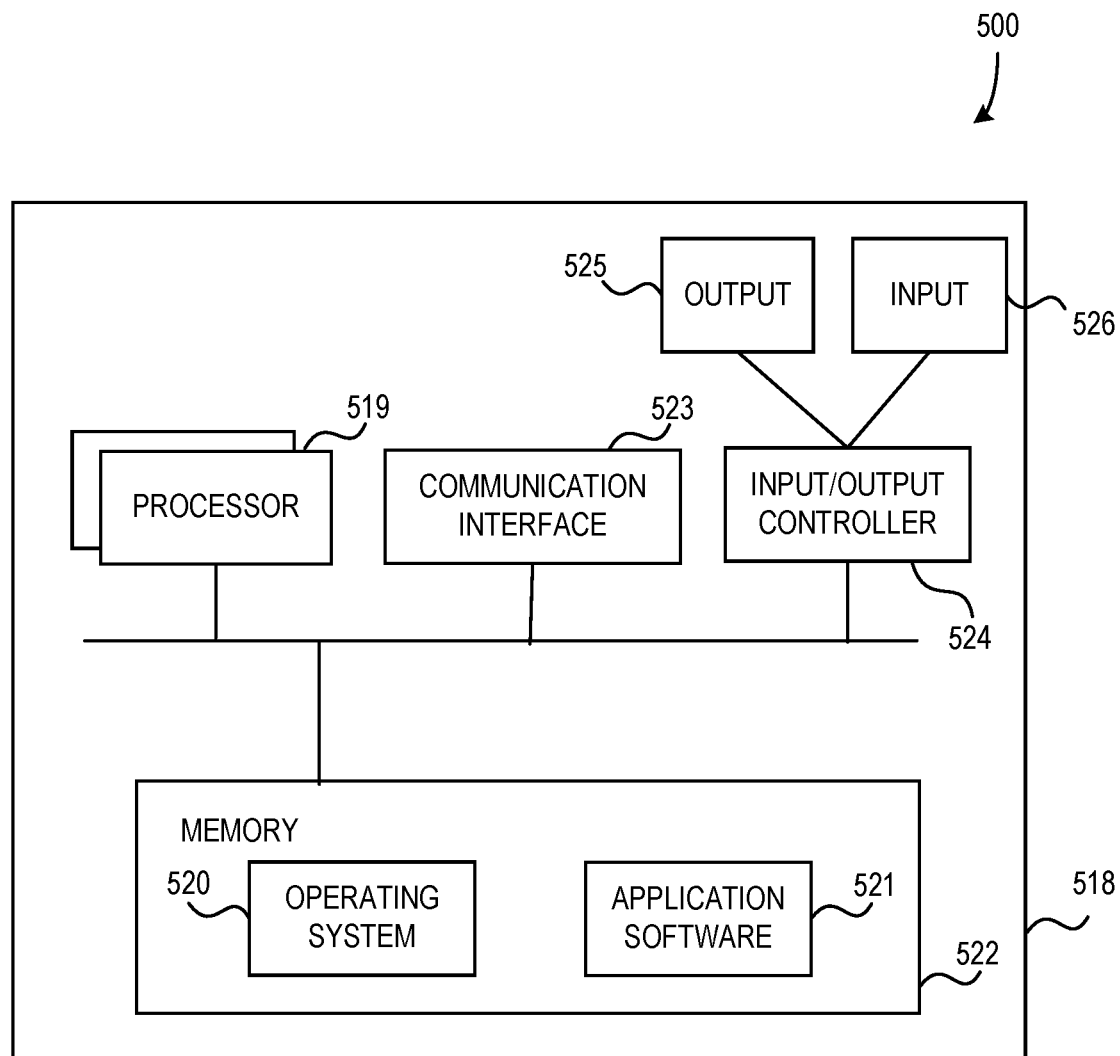
FIG. 5 illustrates a computing apparatus according to an embodiment as a functional block diagram.

The present disclosure is operable with a computing apparatus according to an embodiment as a functional block diagram 500 in FIG. 5. In an embodiment, components of a computing apparatus 518 may be implemented as a part of an electronic device according to one or more embodiments described in this specification. The computing apparatus 518 comprises one or more processors 519 which may be microprocessors, controllers or any other suitable type of processors for processing computer executable instructions to control the operation of the electronic device. Alternatively, or in addition, the processor 519 is any technology capable of executing logic or instructions, such as a hard-coded machine. Platform software comprising an operating system 520 or any other suitable platform software may be provided on the apparatus 518 to enable application software 521 to be executed on the device. According to an embodiment, generating an ordered filter driver list based on a defined filter driver level order and associated filter driver data and providing the ordered filter driver list for use in processing I/O of an associated device as described herein may be accomplished by software.

Computer executable instructions may be provided using any computer-readable media that are accessible by the computing apparatus 518. Computer-readable media may include, for example, computer storage media such as a memory 522 and communications media. Computer storage media, such as a memory 522, include volatile and non-volatile, removable and non-removable media implemented in any method or technology for storage of information such as computer readable instructions, data structures, program modules or the like. Computer storage media include, but are not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 522) is shown within the computing apparatus 518, it will be appreciated by a person skilled in the art, that the storage may be distributed or located remotely and accessed via a network or other communication link (e.g. using a communication interface 523).

The computing apparatus 518 may comprise an input/output controller 524 configured to output information to one or more output devices 525, for example a display or a speaker, which may be separate from or integral to the electronic device. The input/output controller 524 may also be configured to receive and process an input from one or more input devices 526, for example, a keyboard, a microphone or a touchpad. In one embodiment, the output device 525 may also act as the input device. An example of such a device may be a touch sensitive display. The input/output controller 524 may also output data to devices other than the output device, e.g. a locally connected printing device. In some embodiments, a user may provide input to the input device(s) 526 and/or receive output from the output device(s) 525.

The functionality described herein can be performed, at least in part, by one or more hardware logic components. According to an embodiment, the computing apparatus 518 is configured by the program code when executed by the processor 519 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, etc.) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

In examples involving a general-purpose computer, aspects of the disclosure transform the general-purpose computer into a special-purpose computing device when configured to execute the instructions described herein.

Alternatively, or in addition to the other examples described herein, examples include any combination of the following:

A system for generating an ordered filter driver list for use in processing I/O of an associated device, the system comprising:
at least one processor; and
at least one memory communicatively coupled to the at least one processor and comprising computer program code, the at least one memory and the computer program code configured to, with the at least one processor, cause the at least one processor to:
define a filter driver level order associated with the device;
receive a request, from an entity, for an ordered filter driver list associated with the device;
access filter driver data of a plurality of filter drivers associated with the device from a filter driver data store, the filter driver data including a filter driver identifier of each filter driver of the plurality of filter drivers and a filter driver level of each filter driver of the plurality of filter drivers;
generate the ordered filter driver list based on the accessed filter driver data, wherein the ordered filter driver list includes the filter driver identifiers of the plurality of filter drivers in an order based on the associated filter driver levels and the defined filter driver level order; and
provide the ordered filter driver list to the entity, wherein the entity is configured to process I/O messages associated with the device through the plurality of filter drivers in the order of the ordered filter driver list.
wherein the plurality of filter drivers includes an inflection point driver that is associated with a filter driver level and a second plurality of filter drivers; and
wherein generating the ordered filter list includes merging the filter drivers associated with the filter driver level of the inflection point driver and the second plurality of filter drivers in the ordered filter list, the merging including:
appending the plurality of filter drivers associated with the filter driver level except for the inflection point driver to the ordered filter list;
appending the second plurality of filter drivers except for the inflection point driver to the ordered filter list; and
appending the inflection point driver to the ordered list.
wherein the plurality of filter drivers includes at least one registry filter driver, the registry filter driver lacking an associated driver level;
wherein the defined filter driver level order includes a default filter driver level; and
wherein generating the ordered filter driver list includes adding the at least one registry filter driver to the ordered filter driver list in an order position associated with the default filter driver level.
the computer program code configured to, with the at least one processor, further cause the at least one processor to publish a filter driver manifest that includes the defined filter driver level order, wherein the published filter driver manifest is accessible by other entities.
the computer program code configured to, with the at least one processor, further cause the at least one processor to:
receive a new filter driver for inclusion in the filter driver data store, the new filter driver including a new filter driver identifier and a filter driver level indicator indicating a filter driver level in the defined filter driver level order; and
add the new filter driver to the filter driver data store based on the associated filter driver level indicator.

wherein the defined filter driver level order includes at least one filter driver level configured to process I/O messages prior to a main device driver of the device and at least one filter driver level configured to process I/O messages after the main device driver of the device.
wherein the defined filter driver level order includes at least one of a backup level, an antivirus level, and an encryption level.
A computerized method for generating an ordered filter driver list for use in processing I/O of an associated device, the method comprising:
defining, by a processor, a filter driver level order associated with a device;
receiving, by the processor, a request, from an entity, for an ordered filter driver list associated with the device;
accessing, by the processor, filter driver data of a plurality of filter drivers associated with the device from a filter driver data store, the filter driver data including a filter driver identifier of each filter driver of the plurality of filter drivers and a filter driver level of each filter driver of the plurality of filter drivers;
generating, by the processor, the ordered filter driver list based on the accessed filter driver data, wherein the ordered filter driver list includes the filter driver identifiers of the plurality of filter drivers in an order based on the associated filter driver levels and the defined filter driver level order; and
providing, by the processor, the ordered filter driver list to the entity, wherein the entity is configured to process I/O messages associated with the device through the plurality of filter drivers in the order of the ordered filter driver list.
wherein the plurality of filter drivers includes an inflection point driver that is associated with a filter driver level and a second plurality of filter drivers; and
wherein generating the ordered filter list includes merging the filter drivers associated with the filter driver level of the inflection point driver and the second plurality of filter drivers in the ordered filter list, the merging including:
appending the plurality of filter drivers associated with the filter driver level except for the inflection point driver to the ordered filter list;
appending the second plurality of filter drivers except for the inflection point driver to the ordered filter list; and
appending the inflection point driver to the ordered list.
wherein the plurality of filter drivers includes at least one registry filter driver, the registry filter driver lacking an associated driver level;
wherein the defined filter driver level order includes a default filter driver level; and
wherein generating the ordered filter driver list includes adding the at least one registry filter driver to the ordered filter driver list in an order position associated with the default filter driver level.
further comprising publishing, by the processor, a filter driver manifest that includes the defined filter driver level order, wherein the published filter driver manifest is accessible by other entities.
further comprising receiving, by the processor, a new filter driver for inclusion in the filter driver data store, the new filter driver including a new filter driver identifier and a filter driver level indicator indicating a filter driver level in the defined filter driver level order; and adding, by the processor, the new filter driver to the filter driver data store based on the associated filter driver level indicator.
wherein the defined filter driver level order includes at least one filter driver level configured to process I/O messages prior to a main device driver of the device and at least one filter driver level configured to process I/O messages after the main device driver of the device.
wherein the defined filter driver level order includes at least one of a backup level, an antivirus level, and an encryption level.
One or more computer storage media having computer-executable instructions for generating an ordered filter driver list for use in processing I/O of an associated device that, upon execution by a processor, cause the processor to at least:
define a filter driver level order associated with the device;
receive a request, from an entity, for an ordered filter driver list associated with the device;
access filter driver data of a plurality of filter drivers associated with the device from a filter driver data store, the filter driver data including a filter driver identifier of each filter driver of the plurality of filter drivers and a filter driver level of each filter driver of the plurality of filter drivers;
generate the ordered filter driver list based on the accessed filter driver data, wherein the ordered filter driver list includes the filter driver identifiers of the plurality of filter drivers in an order based on the associated filter driver levels and the defined filter driver level order; and
provide the ordered filter driver list to the entity, wherein the entity is configured to process I/O messages associated with the device through the plurality of filter drivers in the order of the ordered filter driver list.
wherein the plurality of filter drivers includes an inflection point driver that is associated with a filter driver level and a second plurality of filter drivers; and
wherein generating the ordered filter list includes merging the filter drivers associated with the filter driver level of the inflection point driver and the second plurality of filter drivers in the ordered filter list, the merging including:
appending the plurality of filter drivers associated with the filter driver level except for the inflection point driver to the ordered filter list;
appending the second plurality of filter drivers except for the inflection point driver to the ordered filter list; and
appending the inflection point driver to the ordered list.
wherein the plurality of filter drivers includes at least one registry filter driver, the registry filter driver lacking an associated driver level;
wherein the defined filter driver level order includes a default filter driver level; and
wherein generating the ordered filter driver list includes adding the at least one registry filter driver to the ordered filter driver list in an order position associated with the default filter driver level.
the computer-executable instructions, upon execution by the processor, further causing the processor to at least publish a filter driver manifest that includes the defined filter driver level order, wherein the published filter driver manifest is accessible by other entities.
the computer-executable instructions, upon execution by the processor, further causing the processor to at least:

receive a new filter driver for inclusion in the filter driver data store, the new filter driver including a new filter driver identifier and a filter driver level indicator indicating a filter driver level in the defined filter driver level order; and
add the new filter driver to the filter driver data store based on the associated filter driver level indicator.
wherein the defined filter driver level order includes at least one filter driver level configured to process I/O messages prior to a main device driver of the device and at least one filter driver level configured to process I/O messages after the main device driver of the device.

Any range or device value given herein may be extended or altered without losing the effect sought, as will be apparent to the skilled person.

While no personally identifiable information is tracked by aspects of the disclosure, examples have been described with reference to data monitored and/or collected from the users. In some examples, notice may be provided to the users of the collection of the data (e.g., via a dialog box or preference setting) and users are given the opportunity to give or deny consent for the monitoring and/or collection. The consent may take the form of opt-in consent or opt-out consent.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but within the scope of aspects of the claims constitute exemplary means for defining a filter driver level order associated with a device; means for receiving a request, from an entity, for an ordered filter driver list associated with the device; means for accessing filter driver data of a plurality of filter drivers associated with the device from a filter driver data store, the filter driver data including a filter driver identifier of each filter driver of the plurality of filter drivers and a filter driver level of each filter driver of the plurality of filter drivers; means for generating the ordered filter driver list based on the accessed filter driver data, wherein the ordered filter driver list includes the filter driver identifiers of the plurality of filter drivers in an order based on the associated filter driver levels and the defined filter driver level order; and means for providing the ordered filter driver list to the entity, wherein the entity is configured to process I/O messages associated with the device through the plurality of filter drivers in the order of the ordered filter driver list. The illustrated one or more processors 519 together with the computer program code stored in memory 522 constitute exemplary processing means for accessing filter driver data and a defined level order and generating an ordered filter driver list based thereon as described herein.

The term "comprising" is used in this specification to mean including the feature(s) or act(s) followed thereafter, without excluding the presence of one or more additional features or acts.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for generating an ordered filter driver list for use in processing I/O of an associated device, the system comprising:
   at least one processor; and
   at least one memory communicatively coupled to the at least one processor and comprising computer program code, the at least one memory and the computer program code configured to, with the at least one processor, cause the at least one processor to:
   define a filter driver level order associated with the device;
   receive a request, from an entity, for an ordered filter driver list associated with the device;
   access filter driver data of a plurality of filter drivers associated with the device from a filter driver data store, the filter driver data including a filter driver identifier of each filter driver of the plurality of filter drivers and a filter driver level of each filter driver of the plurality of filter drivers;
   generate the ordered filter driver list based on the accessed filter driver data, wherein the ordered filter driver list includes the filter driver identifiers of the plurality of filter drivers in an order based on the associated filter driver levels and the defined filter driver level order; and
   provide the ordered filter driver list to the entity, wherein the entity is configured to process I/O messages associated with the device through the plurality of filter drivers in the order of the ordered filter driver list.

2. The system of claim 1, wherein the plurality of filter drivers includes an inflection point driver that is associated with a filter driver level and a second plurality of filter drivers; and
   wherein generating the ordered filter list includes merging the filter drivers associated with the filter driver level of the inflection point driver and the second plurality of filter drivers in the ordered filter list, the merging including:
   appending the plurality of filter drivers associated with the filter driver level except for the inflection point driver to the ordered filter list;
   appending the second plurality of filter drivers except for the inflection point driver to the ordered filter list; and
   appending the inflection point driver to the ordered list.

3. The system of claim 1, wherein the plurality of filter drivers includes at least one registry filter driver, the registry filter driver lacking an associated driver level;
   wherein the defined filter driver level order includes a default filter driver level; and
   wherein generating the ordered filter driver list includes adding the at least one registry filter driver to the ordered filter driver list in an order position associated with the default filter driver level.

4. The system of claim 1, the computer program code configured to, with the at least one processor, further cause the at least one processor to publish a filter driver manifest that includes the defined filter driver level order, wherein the published filter driver manifest is accessible by other entities.

5. The system of claim 1, the computer program code configured to, with the at least one processor, further cause the at least one processor to:
   receive a new filter driver for inclusion in the filter driver data store, the new filter driver including a new filter driver identifier and a filter driver level indicator indicating a filter driver level in the defined filter driver level order; and
   add the new filter driver to the filter driver data store based on the associated filter driver level indicator.

6. The system of claim 1, wherein the defined filter driver level order includes at least one filter driver level configured to process I/O messages prior to a main device driver of the device and at least one filter driver level configured to process I/O messages after the main device driver of the device.

7. The system of claim 1, wherein the defined filter driver level order includes at least one of a backup level, an antivirus level, and an encryption level.

8. A computerized method for generating an ordered filter driver list for use in processing I/O of an associated device, the method comprising:
   defining, by a processor, a filter driver level order associated with a device;
   receiving, by the processor, a request, from an entity, for an ordered filter driver list associated with the device;
   accessing, by the processor, filter driver data of a plurality of filter drivers associated with the device from a filter driver data store, the filter driver data including a filter driver identifier of each filter driver of the plurality of filter drivers and a filter driver level of each filter driver of the plurality of filter drivers;
   generating, by the processor, the ordered filter driver list based on the accessed filter driver data, wherein the ordered filter driver list includes the filter driver identifiers of the plurality of filter drivers in an order based on the associated filter driver levels and the defined filter driver level order; and providing, by the processor, the ordered filter driver list to the entity, wherein the entity is configured to process I/O messages associated with the device through the plurality of filter drivers in the order of the ordered filter driver list.

9. The computerized method of claim 8, wherein the plurality of filter drivers includes an inflection point driver that is associated with a filter driver level and a second plurality of filter drivers; and wherein generating the ordered filter list includes merging the filter drivers associated with the filter driver level of the inflection point driver and the second plurality of filter drivers in the ordered filter list, the merging including:

appending the plurality of filter drivers associated with the filter driver level except for the inflection point driver to the ordered filter list;

appending the second plurality of filter drivers except for the inflection point driver to the ordered filter list; and appending the inflection point driver to the ordered list.

10. The computerized method of claim 8, wherein the plurality of filter drivers includes at least one registry filter driver, the registry filter driver lacking an associated driver level;

wherein the defined filter driver level order includes a default filter driver level; and wherein generating the ordered filter driver list includes adding the at least one registry filter driver to the ordered filter driver list in an order position associated with the default filter driver level.

11. The computerized method of claim 8, further comprising publishing, by the processor, a filter driver manifest that includes the defined filter driver level order, wherein the published filter driver manifest is accessible by other entities.

12. The computerized method of claim 8, further comprising:

receiving, by the processor, a new filter driver for inclusion in the filter driver data store, the new filter driver including a new filter driver identifier and a filter driver level indicator indicating a filter driver level in the defined filter driver level order; and adding, by the processor, the new filter driver to the filter driver data store based on the associated filter driver level indicator.

13. The computerized method of claim 8, wherein the defined filter driver level order includes at least one filter driver level configured to process I/O messages prior to a main device driver of the device and at least one filter driver level configured to process I/O messages after the main device driver of the device.

14. The computerized method of claim 8, wherein the defined filter driver level order includes at least one of a backup level, an antivirus level, and an encryption level.

15. One or more computer storage media having computer-executable instructions for generating an ordered filter driver list for use in processing I/O of an associated device that, upon execution by a processor, cause the processor to at least:

define a filter driver level order associated with the device;

receive a request, from an entity, for an ordered filter driver list associated with the device;

access filter driver data of a plurality of filter drivers associated with the device from a filter driver data store, the filter driver data including a filter driver identifier of each filter driver of the plurality of filter drivers and a filter driver level of each filter driver of the plurality of filter drivers;

generate the ordered filter driver list based on the accessed filter driver data, wherein the ordered filter driver list includes the filter driver identifiers of the plurality of filter drivers in an order based on the associated filter driver levels and the defined filter driver level order; and provide the ordered filter driver list to the entity, wherein the entity is configured to process I/O messages associated with the device through the plurality of filter drivers in the order of the ordered filter driver list.

16. The one or more computer storage media of claim 15, wherein the plurality of filter drivers includes an inflection point driver that is associated with a filter driver level and a second plurality of filter drivers; and wherein generating the ordered filter list includes merging the filter drivers associated with the filter driver level of the inflection point driver and the second plurality of filter drivers in the ordered filter list, the merging including:

appending the plurality of filter drivers associated with the filter driver level except for the inflection point driver to the ordered filter list;

appending the second plurality of filter drivers except for the inflection point driver to the ordered filter list; and appending the inflection point driver to the ordered list.

17. The one or more computer storage media of claim 15, wherein the plurality of filter drivers includes at least one registry filter driver, the registry filter driver lacking an associated driver level;

wherein the defined filter driver level order includes a default filter driver level; and wherein generating the ordered filter driver list includes adding the at least one registry filter driver to the ordered filter driver list in an order position associated with the default filter driver level.

18. The one or more computer storage media of claim 15, the computer-executable instructions, upon execution by the processor, further causing the processor to at least publish a filter driver manifest that includes the defined filter driver level order, wherein the published filter driver manifest is accessible by other entities.

19. The one or more computer storage media of claim 15, the computer-executable instructions, upon execution by the processor, further causing the processor to at least:

receive a new filter driver for inclusion in the filter driver data store, the new filter driver including a new filter driver identifier and a filter driver level indicator indicating a filter driver level in the defined filter driver level order; and add the new filter driver to the filter driver data store based on the associated filter driver level indicator.

20. The one or more computer storage media of claim 15, wherein the defined filter driver level order includes at least one filter driver level configured to process I/O messages prior to a main device driver of the device and at least one filter driver level configured to process I/O messages after the main device driver of the device.

* * * * *